No. 711,188. Patented Oct. 14, 1902.
G. C. STONE.
APPARATUS FOR SEPARATING AND RECOVERING FUMES OF ARSENIC, &c.
(Application filed Oct. 29, 1901.)
(No Model.)

Witnesses.
D. W. Edelin
Chas. J. O'Neill

Inventor.
George C. Stone,
by Lennie & Goldsborough,
Attys.

UNITED STATES PATENT OFFICE.

GEORGE C. STONE, OF JERSEY CITY, NEW JERSEY, ASSIGNOR TO THE NEW JERSEY ZINC COMPANY, A CORPORATION OF NEW JERSEY.

APPARATUS FOR SEPARATING AND RECOVERING FUMES OF ARSENIC, &c.

SPECIFICATION forming part of Letters Patent No. 711,188, dated October 14, 1902.

Application filed October 29, 1901. Serial No. 80,452. (No model.)

*To all whom it may concern:*

Be it known that I, GEORGE C. STONE, a citizen of the United States, residing at Jersey City, county of Hudson, and State of New Jersey, have invented certain new and useful Improvements in Apparatus for Separating and Recovering Fumes of Arsenic and the Like; and I do hereby declare the following to be a full, clear, and exact description of the invention, such as will enable others skilled in the art to which it appertains to make and use the same.

My invention relates to apparatus for separating and recovering fumes of arsenic and the like from furnace-gases in the manufacture of sulfuric acid or sulfuric anhydrid.

In the utilization of furnace-gases, particularly the gases evolved from ore-roasting furnaces, for the manufacture of sulfuric acid or sulfuric anhydrid the arsenic and other volatile products which would constitute objectionable impurities in the acid product must be removed before the synthetic production of the acid or the anhydrid is accomplished.

My present invention comprises a separator and condenser through which the furnace-gases, cooled to substantially the point of deposition of the arsenic and the like, are passed and in which the arsenic and like constituents are condensed and retained upon or within a body of filter material interposed in the path of the gases through the apparatus.

Figure 1:
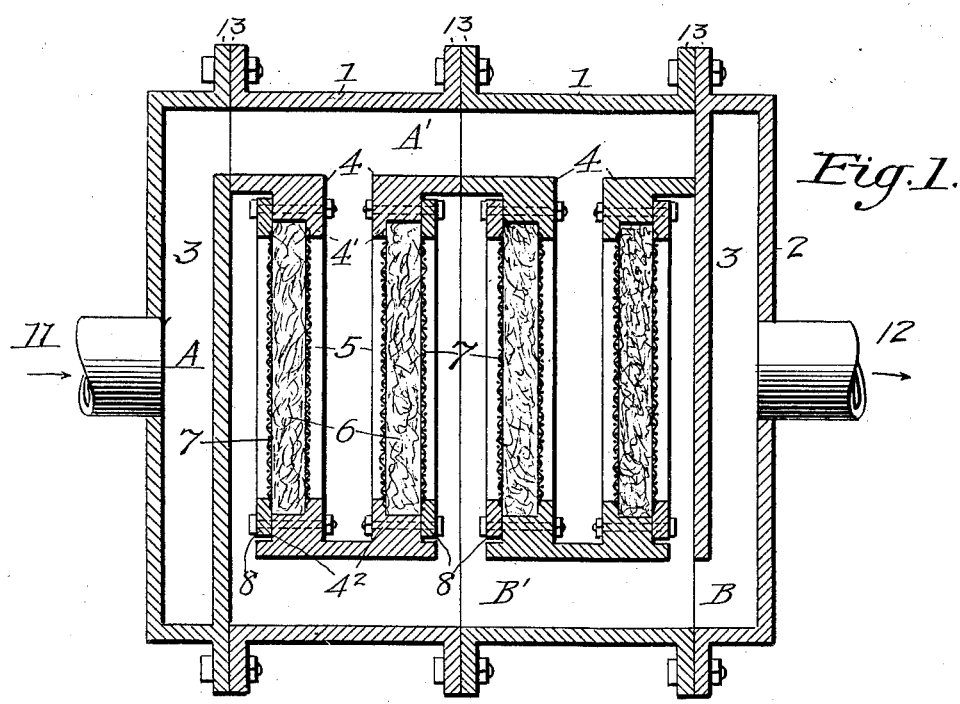
Figure 2:
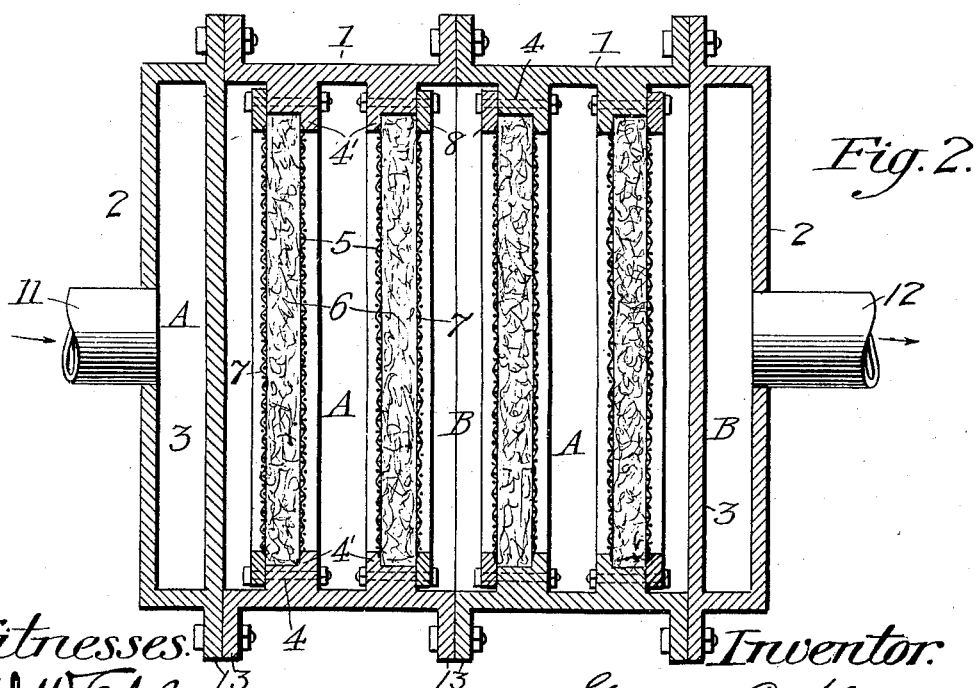

In the accompanying drawings, wherein I have illustrated apparatus adapted for the practice of my invention, Figure 1 is a vertical cross-section through the condenser and separator, and Fig. 2 is a horizontal section taken at right angles to Fig. 1.

Referring to the drawings, the condenser and separator comprises a casing, preferably of metal, formed of central externally-flanged box-like sections 1, to which are secured end sections 2. Each of said end sections is provided with a wall or partition 3, the respective partitions terminating a short distance from the upper and lower walls of the casing, whereby an inlet-chamber A is formed in one head and an exit-chamber B is formed in the other head, with the openings from said chambers into the intermediate sections disposed at diagonally opposite points in the casing. A supply-pipe 11 connects the furnace or other source with chamber A, while an outlet-pipe 12 leads the purified gases to the oxidizing apparatus. The intermediate sections are secured to the end sections and to each other by suitable bolts passing through the abutting flanges 13. Each of said intermediate sections is provided with a series of internal flanges 4, which when the sections are joined together form a series of U-shaped pockets opening alternately toward the longitudinal channels A' B', communicating with the inlet and outlet channels A and B, respectively. Mounted in each of the rectangular frame-like structures formed by these flanges is a screen or condenser comprising a sheet of steel-wire gauze or the like 5, supported on the projecting rim 4' of the flanges 4, upon which sheet is placed a layer of filter material 6, preferably of asbestos or like refractory material that is unaffected by heat or chemical action of the gases. This layer, which constitutes the condensing and separating medium proper, is secured in place by another sheet of wire-gauze 7, which in turn is held in position by a frame 8, attached to the flanges 4 by bolts. It will be seen that each intermediate section of the casing carries two screen or condenser sections, with a space between them communicating with the gas-inlet, while the adjacent screens of contiguous sections form pocket-like recesses opening into the inlet-channel. The apparatus may be quickly dismantled for the purpose of removing one or all of the screen-sections or for the purpose of supplying additional or replacing old or damaged screens. Likewise separate casing-sections may be added to or removed from the apparatus to increase or diminish the capacity of the separator.

The operation of the apparatus as described is as follows: The gases from the furnace are cooled to substantially the temperature of deposition of the fumes of arsenic and like volatile constituents. This cooling may be accomplished in any well-known manner. The mixed gases enter at 11, pass by way of chambers A and A' into the spaces between the screens 6, thence laterally through said screens, where the arsenic and like volatile constituents are condensed and retained upon and within the body of the filter mass of the screen. The sulfur fumes, which are not condensed at the temperature employed to separate the arsenic and other impurities, pass through the separator-screens and by way of chambers B' B and exit-pipe 12 to the oxidizing apparatus, where the acid or the anhydrid is formed. When the separator-screens have taken up sufficient quantities of condensed fumes, the apparatus is disconnected from the gas-supply and the acid-making apparatus for the purpose of removing the deposits of arsenic and the like from the screens and simultaneously cleaning and preparing the screens for further use. This is accomplished by heating the apparatus to a degree sufficient to volatilize the products deposited in and upon the screen, or, preferably, by removing the screens and subjecting the filter material to the action of heat either to drive off the deposited matter or to separate and recover the various desirable elements, particularly the arsenic, by any of the well-known methods of fractional distillation, or instead of utilizing heat for the purpose the deposited material may be removed or recovered from the screens by washing or treating with suitable chemical reagents. After the screen material has been cleansed it is again applied to the apparatus and the operation repeated as often as necessary.

In the apparatus shown each section contains two separator and condenser screens or sections and single passages for the entrance and exit, respectively, of the gases, in which apparatus the gas-passages are so arranged that the gases pass through all of the screens or condenser-sections simultaneously. It may, if preferred, be arranged with a single screen in each section of the casing or with the gas-passages in separate sections. When it is found desirable, the gas-passages may be so arranged that the gases pass through two or more condenser-sections in succession before they are allowed to pass into the exit-chamber, or the gases may be passed successively through a series of separate condensers of the character described.

What I claim as my invention is—

1. A condenser and separator for arsenic and the like, contained in furnace-gases, comprising a casing made up of an inlet end section and an outlet end section provided respectively with an inlet and an outlet conduit, and removable intermediate sections having gas-passages communicating with the gas-passages of the end sections, said intermediate sections containing filter-screens; substantially as described.

2. A condenser and separator for arsenic and the like contained in furnace-gases, comprising a casing made up of an inlet end section and an outlet end section, having each an internal gas-passage and provided respectively with an inlet and an outlet conduit, and removable intermediate sections provided with gas-passages constituting a continuation of the gas-passage of the inlet end section, and with oppositely-disposed gas-passages constituting a continuation of the gas-passage of the outlet end section, and interposed filter-screens, substantially as described.

3. A condenser and separator for arsenic and the like contained in furnace-gases, comprising a casing having inlet and outlet end sections, and removable intermediate sections, each provided with a pair of transverse filter-screens separated from each other by an intervening space, and being further provided at top with a gas-passage communicating with said intervening space, and at bottom with a gas-passage communicating with the exit sides of the screens and with the gas-passage of the outlet end section, substantially as described.

In testimony whereof I affix my signature in presence of two witnesses.

GEORGE C. STONE.

Witnesses:
A. P. COBB,
H. G. CLOPPER.